US012068934B2

(12) United States Patent
Boyd et al.

(10) Patent No.: US 12,068,934 B2
(45) Date of Patent: Aug. 20, 2024

(54) METHOD AND SYSTEM FOR NETWORK SEGMENT PERFORMANCE MONITORING

(71) Applicant: CIENA CORPORATION, Hanover, MD (US)

(72) Inventors: Edward Wayne Boyd, Petaluma, CA (US); Maurice John Bahij Ajluni, Petaluma, CA (US); Matthew D. Hartling, Petaluma, CA (US)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/083,305

(22) Filed: Dec. 16, 2022

(65) Prior Publication Data

US 2023/0198878 A1 Jun. 22, 2023

Related U.S. Application Data

(60) Provisional application No. 63/291,865, filed on Dec. 20, 2021.

(51) Int. Cl.
| | |
|---|---|
| *H04L 43/0817* | (2022.01) |
| *H04L 43/062* | (2022.01) |
| *H04L 43/106* | (2022.01) |
| *H04L 43/16* | (2022.01) |
| *H04L 41/12* | (2022.01) |
| *H04L 41/14* | (2022.01) |
| *H04L 41/16* | (2022.01) |

(52) U.S. Cl.
CPC ........ *H04L 43/0817* (2013.01); *H04L 43/062* (2013.01); *H04L 43/106* (2013.01); *H04L 43/16* (2013.01); *H04L 41/12* (2013.01); *H04L 41/14* (2013.01); *H04L 41/16* (2013.01)

(58) Field of Classification Search
CPC ..... H04L 45/124; H04L 45/306; H04L 43/16; H04L 63/30
See application file for complete search history.

(56) References Cited

U.S. PATENT DOCUMENTS

| | | | | |
|---|---|---|---|---|
| 8,289,845 | B1* | 10/2012 | Baldonado | H04L 43/16 |
| | | | | 709/239 |
| 2007/0248153 | A1* | 10/2007 | Polk | H04L 12/66 |
| | | | | 375/222 |
| 2008/0123586 | A1* | 5/2008 | Manser | H04L 41/12 |
| | | | | 455/457 |
| 2020/0396135 | A1* | 12/2020 | Ma | H04L 41/16 |
| 2022/0029906 | A1* | 1/2022 | Mahesh | H04L 41/14 |

(Continued)

*Primary Examiner* — Barbara B Anyan
(74) *Attorney, Agent, or Firm* — Guntin & Gust, PLC; Atanu Das (57) ABSTRACT

One embodiment provides a system and method for monitoring performance of a network. During operation, in response to receiving a performance-monitoring request, the system can select a plurality of network devices along an end-to-end path from an application server to a terminal device and configure each selected network device to function as an observation point to obtain flow-specific packet information. The system can receive, from each observation point, the flow-specific packet information and aggregate flow-specific packet information received from multiple observation points to obtain performance data associated with one or more segments along the end-to-end path, each segment being defined by a pair of observation points.

20 Claims, 8 Drawing Sheets

100

(56) References Cited

U.S. PATENT DOCUMENTS

| | | | |
|---|---|---|---|
| 2022/0224635 A1* | 7/2022 | Watts | H04L 43/16 |
| 2022/0400161 A1* | 12/2022 | Zafiris | H04L 61/5007 |
| 2023/0154253 A1* | 5/2023 | Mitchell | H04B 7/18506 |
| | | | 340/945 |

* cited by examiner

METHOD AND SYSTEM FOR NETWORK SEGMENT PERFORMANCE MONITORING

RELATED APPLICATION

This application hereby claims priority under 35 U.S.C. § 119 to U.S. Provisional Patent Application No. 63/291,865, filed on 20 Dec. 2021, entitled "NETWORK SEGMENT PERFORMANCE MONITORING," by inventors Edward W. Boyd, Maurice John Bahij Ajluni, and Matthew D. Hartling, the disclosure of which is herein incorporated by reference in its entirety for all purposes.

BACKGROUND

Field of the Invention

This disclosure is generally related to performance monitoring in a network. More specifically, this disclosure is related to a method and a system for monitoring the performance of different segments of an end-to-end path.

Related Art

Network operators as well as end users all desire to have the ability to monitor the performance of the network. For example, the operator of a network would want to have knowledge about which part of the network is causing excessive delays and packet losses, or which server is crashed, etc. When an end user experiences network problems (e.g., an unresponsive webpage, frozen or skipped frames during video streaming or online meeting, or poor responsiveness of a multi-player video game), the end user would want to know whether the network problem is caused by the home equipment (e.g., the wireless router or the network card of the terminal device), the equipment of the content provider (e.g., content servers), or the equipment of the Internet service provider (e.g., switches and routers in the carrier's network).

There are a number of existing solutions to monitor the performance of a network. In one approach, a network operator can collect statistics about network traffic on links (e.g., the number of packets received, sent, or dropped at each link) in order to monitor the performance of various links in the network. However, although this approach can be useful in detecting physical-layer errors, it is less effective in monitoring/evaluating end-to-end performance, because the link-level packet count and error statistics can only be used to determine errors or performance of a single network cable or segment. Moreover, conventional tools for collecting the link-level statistics may not be able to detect delay or jitter. In addition, it can be hard to determine whether the packet loss is related to the traffic of interest.

Another approach is to perform speed tests on a device, which can provide information regarding bandwidth, jitter, and delay of traffic flowing through a node (e.g., the wireless router) to another server on the Internet or the carrier's network. However, it may not provide destination- or application-specific traffic information. Pinging a network destination (e.g., a server) can allow a user to measure latency of that particular destination but also does not provide information associated with traffic of a particular application. The end user or the network operator often is more interested in monitoring the end-to-end (i.e., from the application server to the user device) performance of a particular traffic flow in order to resolve the aforementioned network problems. Connectivity Fault Management (CFM)-based schemes can provide end-to-end performance monitoring but rely on added packets (e.g., CFM packets) to perform various diagnostic tasks (e.g., connectivity monitoring, fault verification, fault isolation, etc.), thus reducing the network throughput.

SUMMARY

One embodiment provides a system and method for monitoring performance of a network. During operation, in response to receiving a performance-monitoring request, the system can select a plurality of network devices along an end-to-end path from an application server to a terminal device and configure each selected network device to function as an observation point to obtain flow-specific packet information. The system can receive, from each observation point, the flow-specific packet information, and aggregate flow-specific packet information received from multiple observation points to obtain performance data associated with one or more segments along the end-to-end path, each segment being defined by a pair of observation points.

In a variation on this embodiment, configuring the selected network device can include activating a performance-monitoring unit residing on the selected network device to capture packets arriving at a network interface of the selected network device.

In a further variation, configuring the selected network device can further include applying a filter on the captured packets.

In a further variation, the filter can be applied based on a four-tuple comprising a source address, a destination address, a source port number, and a destination port number.

In a further variation, configuring the selected network device can further include activating the performance-monitoring unit for a predetermined time interval.

In a variation on this embodiment, the flow-specific packet information can include a roundtrip delay of a packet.

In a further variation, the roundtrip delay can be obtained by comparing timestamps of the packet and a corresponding response packet.

In a further variation, the flow-specific packet information can further include jitter and packet loss information.

In a further variation, aggregating the flow-specific packet information can include subtracting roundtrip delays of the packet observed at two observation points to determine a delay caused by a segment between the two observation points.

In a variation on this embodiment, the system can generate and display a graphical representation of the performance data associated with the one or more segments.

BRIEF DESCRIPTION OF THE FIGURES

In the figures, like reference numerals refer to the same figure elements.

DETAILED DESCRIPTION

Overview

Embodiments of the present invention provide a system and method for monitoring network performance by partitioning an end-to-end path into a number of segments and configuring network devices along the path as observation points for collecting performance data associated with traffic of a particular service instance or flow. More particularly, an observation point can extract headers from packets belonging to the service instance or flow to gather, based on the sequence numbers of the packets, delay, packet loss, and jitter statistics. The statistics gathered by each observation point can be sent to a central location (e.g., a remote performance-monitoring server or controller) for analysis. The performance monitoring can be conducted for different applications. The performance monitoring can also be conducted periodically or on demand.

Performance Monitoring on Network Segments

Figure 1:
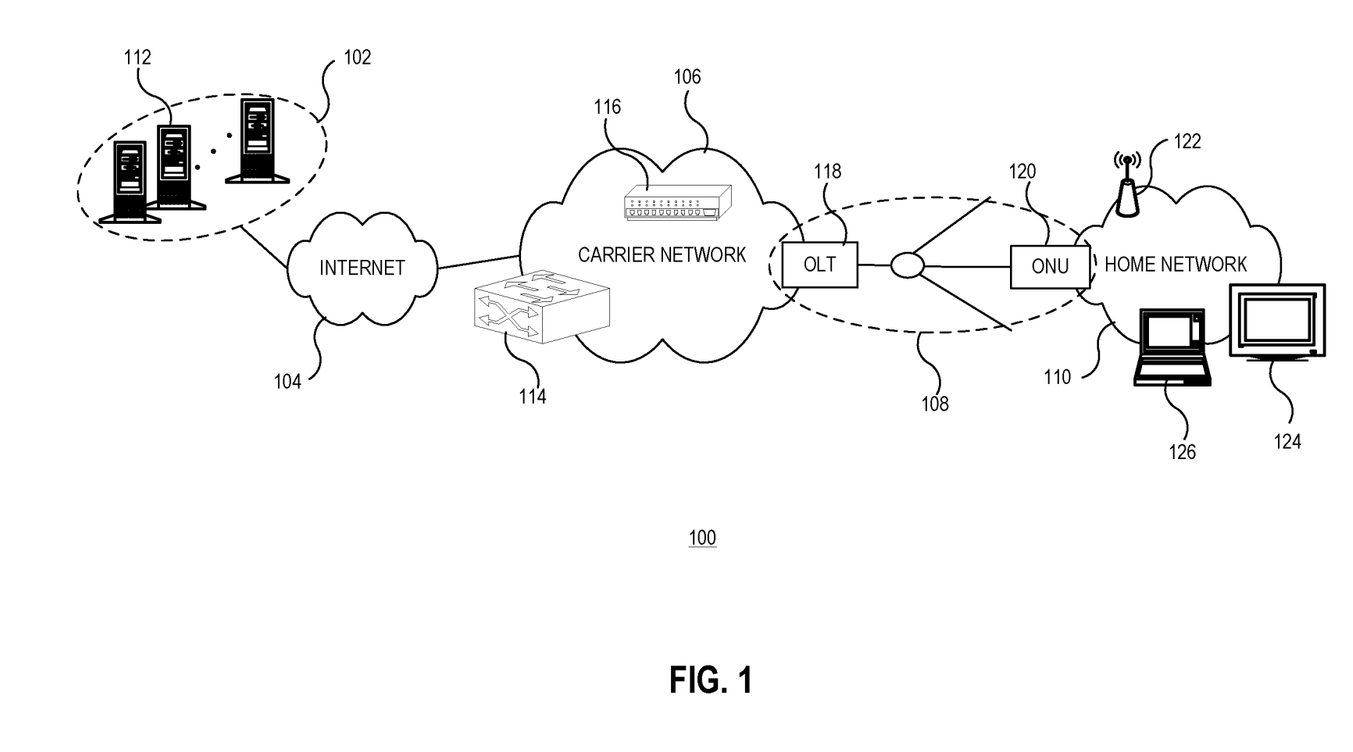
FIG. 1 illustrates an exemplary network with multiple segments, according to one embodiment.

FIG. 1 illustrates an exemplary network with multiple segments, according to one embodiment. In FIG. 1, a network 100 can include an application-server segment 102, an Internet segment 104, a carrier-network segment 106, an access-network segment 108, and a home-network segment 110.

Application-server segment 102 includes a number of application servers (e.g., server 112) that provide specific application services (e.g., streaming services, gaming services, etc.) to user devices in home-network segment 110 via Internet segment 104, carrier-network segment 106 (which can include routers such as a router 114 and switches such as switch 116), and access-network segment 108. In the example shown in FIG. 1, access-network segment 108 can be a passive optical network (PON) and can include an optical line terminal (OLT) 118 and a plurality of optical network units (ONUs), such as an ONU 120. Home-network segment 110 can include a wireless access point or router 122 and a number of terminal devices (e.g., a smart TV 124 and a laptop computer 126).

The end-to-end path in network 100 refers to the path from the origin of the application data (e.g., application server 112) to the device that receives the data (e.g., smart TV 124). In some embodiments, the end-to-end path can be partitioned into multiple segments, and an observation point can be placed at the boundary between adjacent segments. Packet statistics (e.g., packet loss, delay, jitter, etc.) at each segment can be collected at observation points along the path and sent to a performance analyzer to obtain performance information associated with each segment. In the example shown in FIG. 1, there are a number of naturally formed network segments, and edge or gateway devices of the networks can be configured to function as observation points. For example, OLT 118 is on the boundary between carrier-network segment 106 and access-network segment 108, and ONU 120 is on the boundary between access-network segment 108 and home-network segment 110. Both OLT 118 and ONU 120 can be configured to function as observation points to provide performance information associated with these segments (more particularly access-network segment 108). In addition to these naturally formed segments, in practice, a to-be-monitored segment can be arbitrarily defined by a pair of observation points. For example, if switch 116 and ONU 120 are both configured as observation points, the portion of the network that a packet travels between switch 116 and ONU 120 can be considered as a network segment under observation.

Segment-level end-to-end performance monitoring can provide network operators the ability to examine the performance of the network at every segment. In addition, it can enhance the experience of the end users as the end-to-end performance monitoring can observe poor performance at the terminal device, determine which segment on the end-to-end path causes the poor performance (e.g., a congested application server or router, a failed OLT or ONU, a misconfigured home wireless router, etc.), and perform appropriate remedial actions (e.g., expanding the capacity of the application server or router, sending maintenance crew to fix the failed OLT or ONU, sending access-point-configuration instructions to the user, etc.) to improve the performance.

Various mechanisms can be used by an observation point to monitor network performance. In some embodiments, an observation point can observe packets arriving at its network interface (e.g., by collecting statistics associated with the packets), including packets destined to the device and packets that are passing through. There are a number of existing packet-analyzing tools that can be used to capture packet information. For example, the observation point can be configured to implement Wireshark, which is an open-source packet analyzer. Other similar tools, such as tcpdump and snoop, can also be used.

Using Wireshark as an example, the packet-analyzing tool can capture all packets arriving at a networking device and include information (e.g., header information) associated with the captured packets in a packet capture (PCAP) file. From the perspective of improving the experience of the end users, it is important to monitor the performance of a particular service or application. For example, an end user may want to know the reason of the poor quality of the streamed video. To monitor the performance of a particular service, the packet-analyzing tool can be configured to only analyze packets for that particular service. For example, to monitor the performance of an Internet Protocol (IP) service (e.g., a video-streaming or gaming service), all observation points on the end-to-end path of the IP service can be configured to analyze packets with predetermined source/destination IP addresses and source/destination Transmission Control Protocol (TCP) ports. In one embodiment, a packet filter can be configured to filter packet information based on a four-tuple: (source IP address, destination IP address, source port number, destination port number). For TCP/IP packets, this four-tuple defines a TCP flow. For example, the packet filter can identify packets belonging to the same flow based on the four-tuple information included in the header of the packets.

Once identified by the filter as belonging to a flow of interest, information associated with an identified packet can be collected at each observation point and subsequently analyzed. The collected information can include but is not limited to the sequence number of the packet and the timestamp of each capture. By analyzing the packet information collected at each observation point, a packet analyzer can infer the performance (e.g., delay, jitter, packet loss, etc.) of each network segment. For example, each observation point can be configured to track a request and a corresponding response (or acknowledgment) of a packet to determine the roundtrip delay of the packet and/or whether there is a packet loss. The tracking of the request and the corresponding response can be based on the sequence number of the request/response packet. Note that the request packet and its corresponding response packet have the same sequence number. By comparing the roundtrip delays of packets recorded at two observation points, the performance-monitoring system can determine the performance of the network segment between the two observation points.

Figure 2:
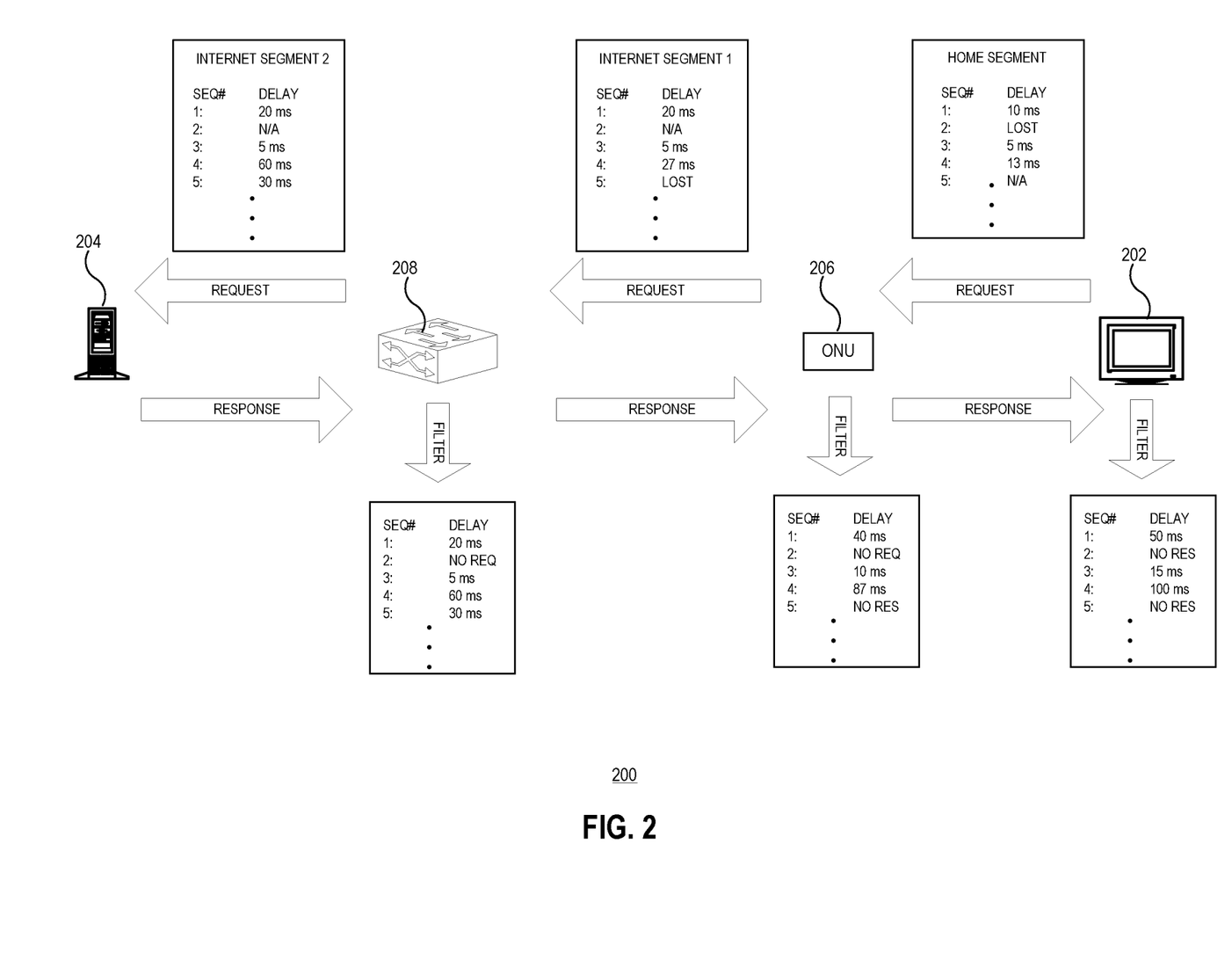
FIG. 2 illustrates an exemplary end-to-end segment-level performance-monitoring scenario, according to one embodiment.

FIG. 2 illustrates an exemplary end-to-end, segment-level performance-monitoring scenario, according to one embodiment. In the example shown in FIG. 2, an end-to-end path 200 for a video-streaming service can include a smart TV 202 for sending packets requesting video content and a video server 204 providing the requested video content. A number of devices along end-to-end path 200 are configured to function as observation points, including smart TV 202, ONU 206, and switch 208. Other network devices not configured as observation points along end-to-end path 200 are not shown in FIG. 2.

As discussed previously, an observation point can be configured to collect information useful for network performance monitoring from packets belonging to a service or flow of interest. For example, a performance-monitoring unit on ONU 206 can capture every packet arriving at the network interface of ONU 206 and extract information included in the packet header. A packet filter can be used to identify packets with a four-tuple (source IP address, destination IP address, source port number, destination port number) matching the corresponding four-tuple of the flow of interest. Information associated with the identified packets can be collected and further analyzed by the performance-monitoring unit on ONU 206. In some embodiments, the performance-monitoring unit can match a response packet to a corresponding request packet and determine the roundtrip delay of the request packet based on the difference between their timestamps. For example, at time instant $t_1$, ONU 206 captures a request packet with a particular sequence number sent from smart TV 202, and at time instant $t_2$, ONU 206 captures a response packet with the same particular sequence number sent from video server 204. Accordingly, the performance-monitoring unit can determine that the roundtrip delay (e.g., the time needed for the packet to travel from ONU 206 to video server 204 and back) for the packet with that particular sequence number is $t_2-t_1$. On the other hand, if a packet with a certain sequence number is never observed by the performance-monitoring unit on ONU 206, the packet can be considered lost. Note that there can be different packet-loss scenarios. In one scenario, a request packet from smart TV 202 is lost before it reaches ONU 206. As a result, ONU 206 will not observe the passing of the request packet or the corresponding response packet. In a different scenario, a request packet from smart TV 202 reaches ONU 206, but it may not reach video server 204. As a result, ONU 206 observes the passing of the request packet but will not observe the passing of the corresponding response packet. In yet another scenario, a request packet from smart TV 202 reaches ONU 206 and video server 204; however, the corresponding response packet is lost before it reaches ONU 206. Like the previous scenario, ONU 206 can observe the passing of the request packet but will not be able to see the corresponding response packet.

In some embodiments, the performance-monitoring unit on each observation point can construct a delay table to summarize the collected packet information. The delay table can be organized based on the packet sequence numbers, as shown in FIG. 2. A table generated at smart TV 202 lists packets with sequence numbers starting from 1 to 5 and their respective roundtrip delays measured at smart TV 202. For example, the roundtrip delays for packet no. 1, packet no. 3, and packet no. 4 are 50 ms, 15 ms, and 100 ms, respectively. Smart TV 202 does not see the response packet for packet no. 2 and packet no. 5. A table generated at ONU 206 indicates that the roundtrip delays for packet no. 1, packet no. 3, and packet no. 4 are 40 ms, 10 ms, and 87 ms, respectively. ONU 206 does not see the request packet for packet no. 2 (and consequently no response packet either). ONU 206 also does not see the response packet for packet no. 5. A table generated at switch 208 indicates that the roundtrip delays for packet no. 1, packet no. 3, packet no. 4, and packet no. 5 are 20 ms, 5 ms, 60 ms, and 30 ms, respectively. Switch 208 does not see the request packet for packet no. 2 (and consequently no response packet either). Note that each packet sequence number corresponding to both the request packet and the response packet, and the roundtrip delay of a packet (i.e., the request packet) at an observation point refers to the time difference between the request and response packets observed (or timestamped) at the observation point.

Information included in the delay table can be sent by each observation point to a centralized network-segment-performance-analyzing unit, which can gather information from all tables to obtain performance statistics of each segment on the end-to-end path. For example, by subtracting delays recorded at two observation points, the centralized network-segment-performance-analyzing unit can determine the roundtrip delay of a packet caused by the network segment between the two observation points. Moreover, the centralized network-segment-performance-analyzing unit can determine whether a packet is lost at a particular network segment by comparing the tables obtained at the two observation points.

In the examples shown in FIG. 2, performance information associated with the home segment (i.e., the segment between smart TV 202 and ONU 206) can be obtained by comparing the corresponding tables. The roundtrip delays for packet no. 1, packet no. 3, and packet no. 4 caused by the home segment are 10 ms, 5 ms, and 13 ms, respectively. In addition, because ONU 206 did not see the request of packet no. 2, it is determined that packet no. 2 is a lost packet, and the packet loss occurs on the home segment. No information associated with packet no. 5 can be derived from the tables. For the segment between ONU 206 and switch 208 (i.e., Internet segment 1), the roundtrip delays for packet no. 1, packet no. 3, and packet no. 4 are 20 ms, 5 ms, and 27 ms, respectively. No information associated with packet no. 2 can be derived for this segment. Because the response for packet no. 5 is seen by switch 208 but not by ONU 206, packet no. 5 is determined as lost on Internet segment 1. For the segment between switch 208 and video server 204 (i.e., Internet segment 2), the roundtrip delays for packet no. 1, packet no. 3, packet no. 4, and packet no. 5 are 20 ms, 5 ms, 60 ms, and 30 ms, respectively. No information associated with packet no. 2 can be derived for this segment.

Figure 3:
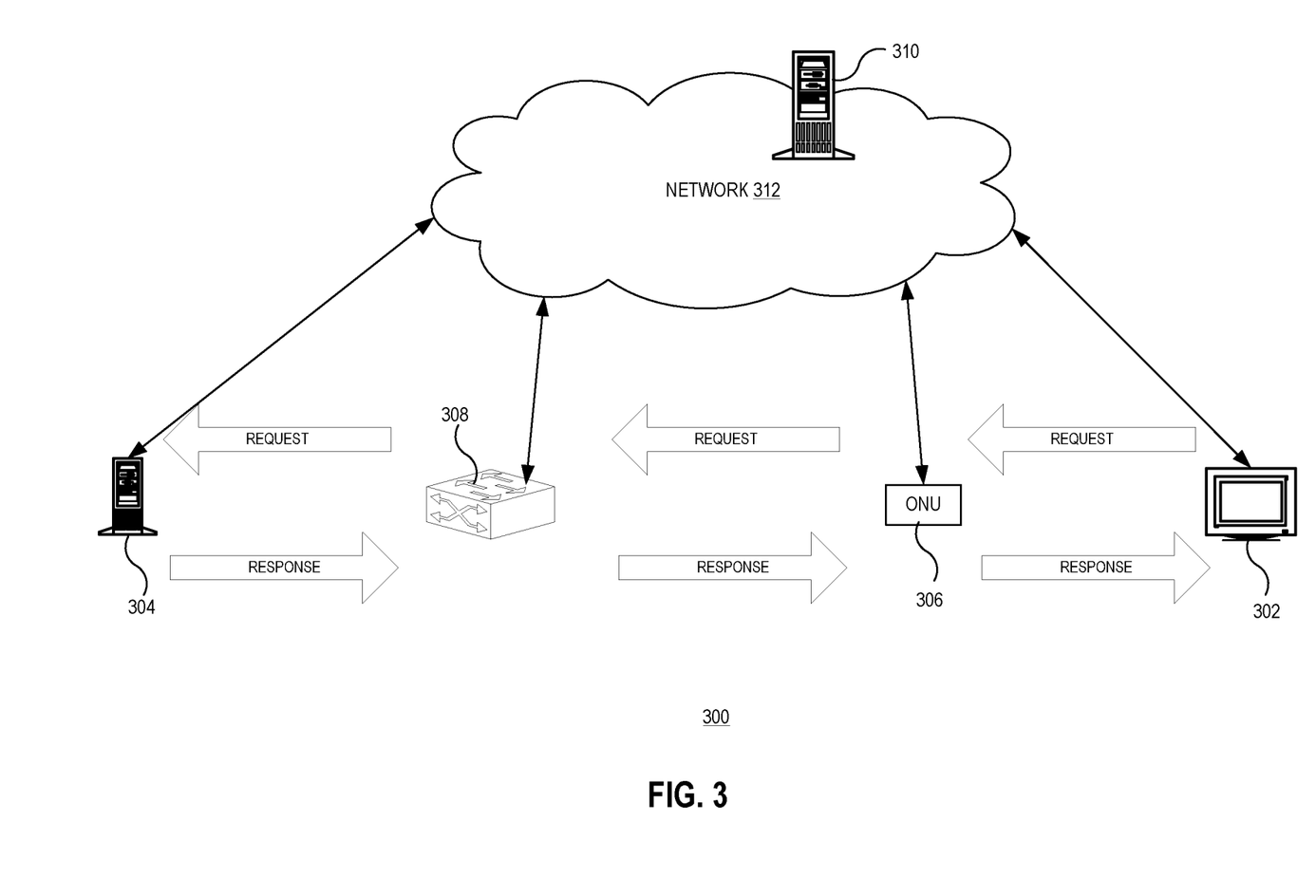
FIG. 3 illustrates an exemplary network-segment-performance-monitoring system, according to one embodiment.

FIG. 3 illustrates an exemplary network-segment-performance-monitoring system, according to one embodiment. Network-segment-performance-monitoring system 300 can include a number of network devices configured to function as observations points along an end-to-end path between a terminal device 302 and an application server 304. Any type of network devices (such as routers, switches, OLTs, ONUs, access points, gateways, hubs, bridges, terminal devices, servers, etc.) can be configured as observation points. In some embodiments, a network device can include a performance-monitoring unit, and configuring the network device as an observation point can be achieved by activating the performance-monitoring unit. Once activated, the performance-monitoring unit can capture packets arriving at the network interface of the network device and collect flow-specific packet statistics.

Network-segment-performance-monitoring system 300 can further include a network-segment-performance-analyzer 310 coupled to the plurality of observation points via a network 312. Each observation point can send the collected flow-specific packet statistics to network-segment-performance-analyzer 310. Based on the flow-specific packet statistics received from the observation points along the path, network-segment-performance-analyzer 310 can determine the performance of each network segment along the path.

In the example shown in FIG. 3, terminal device 302, ONU 306, and switch 308 are configured as observation points, and the network segments can be defined by adjacent observation points. In some embodiments, network-segment-performance-analyzer 310 can send a configuration command to a network device to configure the network device to function as an observation point by activating the performance-monitoring unit residing on the network device. Similarly, network-segment-performance-analyzer 310 can send a configuration command to an observation point to deactivate the performance-monitoring unit. In general, the observation points can be configured dynamically based on needs. To determine the performance of a particular network segment, network-segment-performance-analyzer 310 can configure network devices on either end of the particular network segment as observation points. Moreover, different devices along the path can be configured as observation points at different times. In the example shown in FIG. 3, if at a particular time instant the performance of the home segment needs to be evaluated, network-segment-performance-analyzer 310 can configure terminal device 302 and ONU 306 as observation points (i.e., activating their performance-monitoring units to collect flow-specific packet statistics). In addition to being a separate device independent of other network devices as shown in FIG. 3, network-segment-performance-analyzer 310 can reside on any of the network devices along the path. Moreover, network-segment-performance-analyzer 310 can also be achieved via cloud computing.

In some embodiments, the segment-level performance-monitoring may be performed continuously, which can involve continuously capturing packets flowing through the observation points. In alternative embodiments, the segment-level performance-monitoring may be performed periodically or on demand. More specifically, the observation points can be configured to observe or capture packets within predetermined time windows. A predetermined packet-capturing time window can last from a few seconds to a few minutes. During the predetermined time window, each observation point can capture a plurality of packets belonging to a particular flow and record the roundtrip time for each packet based on the timestamps of request and corresponding response packets. Each observation point can further generate a packet-information table (e.g., a delay table) summarizing the recorded flow-specific packet information. Note that, because it takes time for a packet to travel from one observation point to another observation point along the path, the different observation points may not capture the same set of packets in the time window. To ensure that all observation points are observing the same portion of the flow, in some embodiments, packets captured at the beginning and the end of the time window can be ignored. The guard time at the beginning and the end of the time window can be determined based on the average end-to-end roundtrip delay. For example, the guard time can be twice the average end-to-end roundtrip delay.

The centralized network-segment-performance-analyzer can aggregate the flow-specific packet statistics from all observation points along a service path in order to determine the performance (e.g., delay, jitter, packet loss rate, etc.) of each segment. Alternatively, the centralized network-segment-performance-analyzer can aggregate the flow-specific packet statistics from a subset of observation points in order to determine the performance of a subset of segments along the path.

Figure 4A:
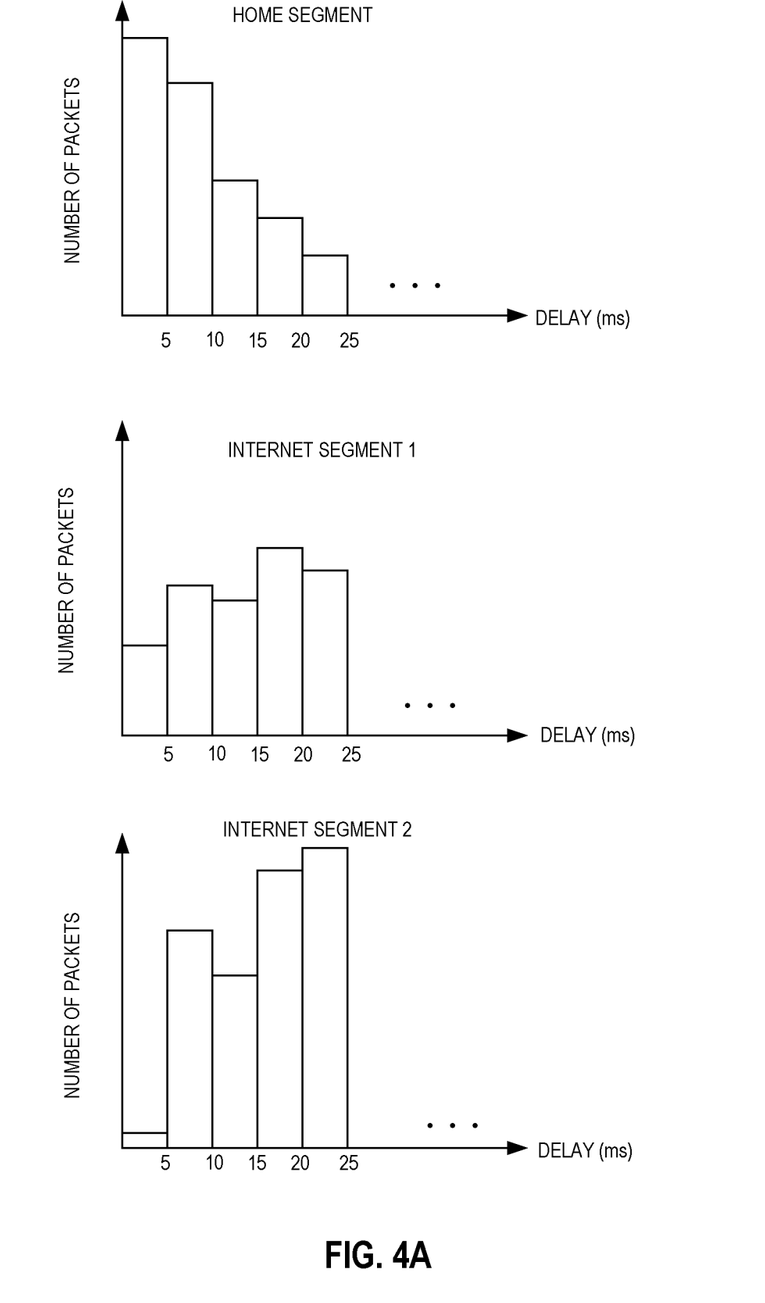
FIG. 4A illustrates exemplary histograms of packet statistics for different network segments, according to one embodiment.

In some embodiments, the centralized network-segment-performance-analyzer can provide a graphic user interface (GUI) that can present the packet statistics of each segment to a user (e.g., an end user of the service or the network operator). In one embodiment, the packet statistics for each segment within a packet-capturing window can be represented using histograms, as shown in FIG. 4A. In the example shown in FIG. 4A, the height of each bar can represent the number of packets having a delay within a certain range (e.g., 0-5 ms, 5-10 ms, etc.).

Figure 4B:
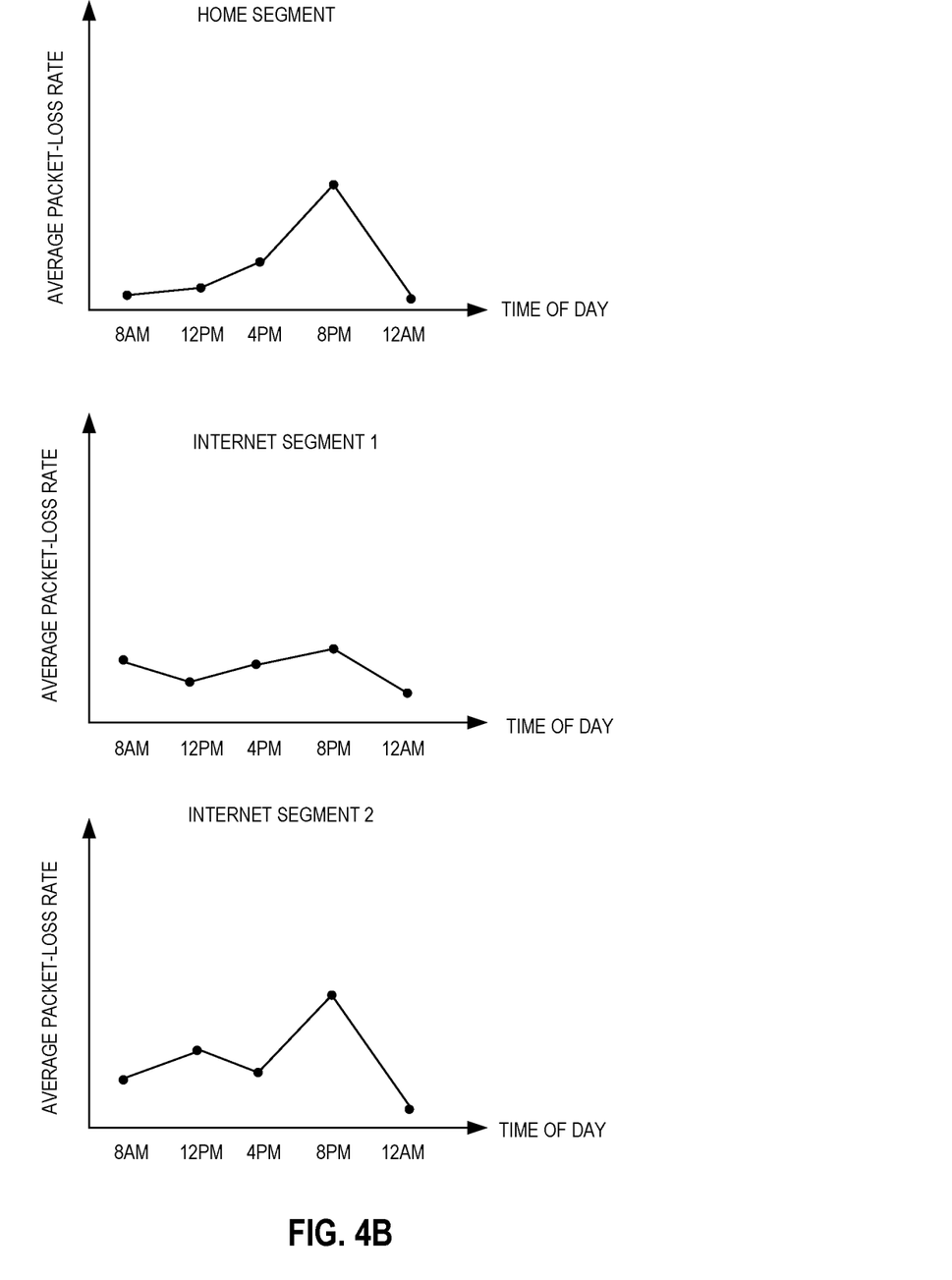
FIG. 4B illustrates average packet-loss rates as a function of time for different network segments, according to one embodiment.

In addition to histograms, other types of graphical representations (e.g., bar graphs, pie charts, or line graphs) can also be used to display the packet statistics. In one embodiment, the network-segment-performance-analyzer can collect flow-specific packet statistics intermittently (e.g., hourly, daily) over a prolonged time period (e.g., a day, a week) and plot the packet statistics as a function of time. FIG. 4B illustrates average packet-loss rates as a function of time for the different network segments, according to one embodiment. The time-dependent performance data can allow the end user or network operator to gain insight regarding the traffic patterns in the different network segments. For example, if the data or graph shows that the packet loss rate at a particular time of day is higher for the application-server segment, the network operator may remind the owner of the application server to increase their server capacity for that particular time of day. In addition to providing packet statistics associated with a single flow, the network-segment-performance-analyzer can configure the observation points to observe traffic from different flows and display the flow-specific packet statistics for the different flows.

Figure 5:
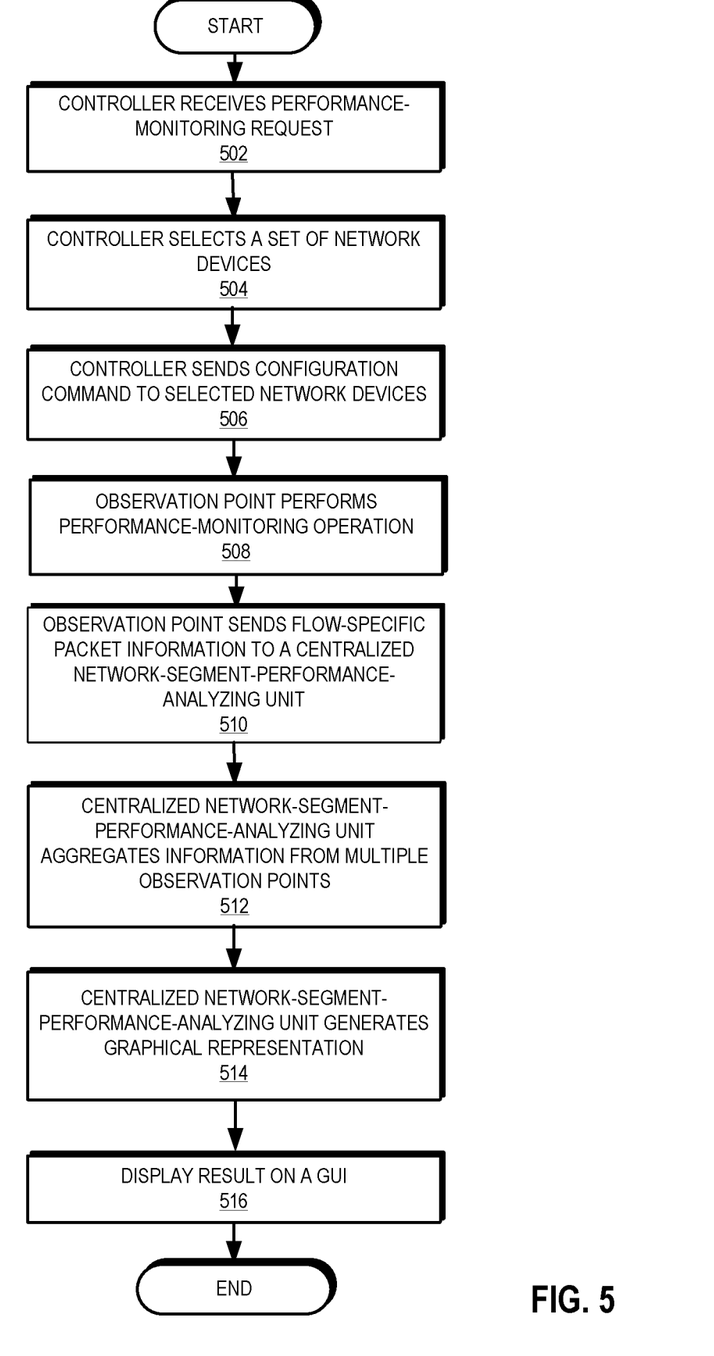
FIG. 5 presents a flowchart illustrating an exemplary process for determining the performance of different network segments, according to one embodiment.

FIG. 5 presents a flowchart illustrating an exemplary process for determining the performance of different network segments, according to one embodiment. During operation, the system controller can receive a performance-monitoring request (operation 502). The performance-monitoring request can be received from an end user of a service, the provider of the service, or the network operator. The performance-monitoring request can include a number of parameters, such as a four-tuple specifying the end-to-end path of a particular service. In some embodiments, the performance-monitoring request can also indicate which segment or segments are of specific interest to the requester. For example, end users may want to know about the performance of their home networks, whereas the Internet service provider may want to know about the performance of particular sections in their network.

Responsive to the request, the system controller may select a set of network devices along the specified path (operation 504) and send a configuration command to each selected network device to configure them to function as observation points (operation 506). The network devices can be selected based on various parameters in the request (e.g., which segment is of particular interest to the requester) as well as which network devices are equipped with the performance-monitoring unit capable of capturing packets and collecting flow-specific packet statistics. In some embodiments, configuring a network device as an observation point can involve activating a performance-monitoring unit on the network device to interact with the network interface controller of the network device such that packets arriving at the network interface of the device can be captured. For example, an observation point can be configured to use a packet-analyzing tool (e.g., Wireshark) to capture packets arriving at the network interface of the device. Configuring a network device as an observation point can also include configuring a packet filter such that only information associated with packets belonging to the flow of interest will be collected. The configuration command can also specify a predetermined performance-monitoring time window (which can last a few seconds or a few minutes), during which the performance-monitoring unit is activated to capture packets.

Each observation point can then perform the performance-monitoring operation to collect the flow-specific packet information (operation 508). In some embodiments, performing the performance-monitoring operation can include identifying a captured request packet and a corresponding response packet based on the sequence number included in the header of the packets and comparing the timestamps of the two captured packets. If packets of certain sequence numbers are not captured, they can be marked as not seen, which can indicate packet loss. In some embodiments, a packet-delay table can be generated at each observation point to list the captured packets and their corresponding roundtrip delays.

Subsequent to collecting the flow-specific packet information, each observation point can send the flow-specific packet information (e.g., the packet-delay table or raw packet data from the filtered packet-capture file) to a centralized network-segment-performance-analyzing unit (operation 510). Note that the centralized network-segment-performance-analyzing unit can reside on the system controller or on any network device on the path. The centralized network-segment-performance-analyzing unit can aggregate the flow-specific packet information received from all observation points along a path to determine the performance of the different segments along the path (operation 512). In some embodiments, the roundtrip delays of a packet measured at adjacent observation points can be subtracted from each other to obtain the roundtrip delay of the packet on the network segment between the two observation points. Other performance data (e.g., jitter and packet loss rate) can also be inferred from the flow-specific packet information received from the observation points. For example, the jitter on the network segment can be determined based on delay variations of a number of packets. The loss of a packet can be determined based on whether one or more observation points fail to capture the packet.

The centralized network-segment-performance-analyzing unit can further generate a graphical representation of the segment-level performance-monitoring result (operation 514) and display the result to the requesting party on a GUI (operation 516). In some embodiments, the performance-monitoring operations can be performed iteratively. For example, based on the segment-level performance-monitoring result, the network operator may identify a network segment (e.g., Internet segment 2 shown in FIG. 2) that has long delays and a high packet loss rate. The network operator may wish to zoom in to determine exactly which smaller segment within Internet segment 2 causes the delay or packet loss. Accordingly, Internet segment 2 can be further partitioned into smaller segments, and additional network devices within Internet segments 2 can be configured as observation points. These additional observation points can perform an additional packet-monitoring operation, and performance of each smaller segment within Internet segment 2 can be inferred based on packet statistics collected by these additional observation points.

Figure 6:
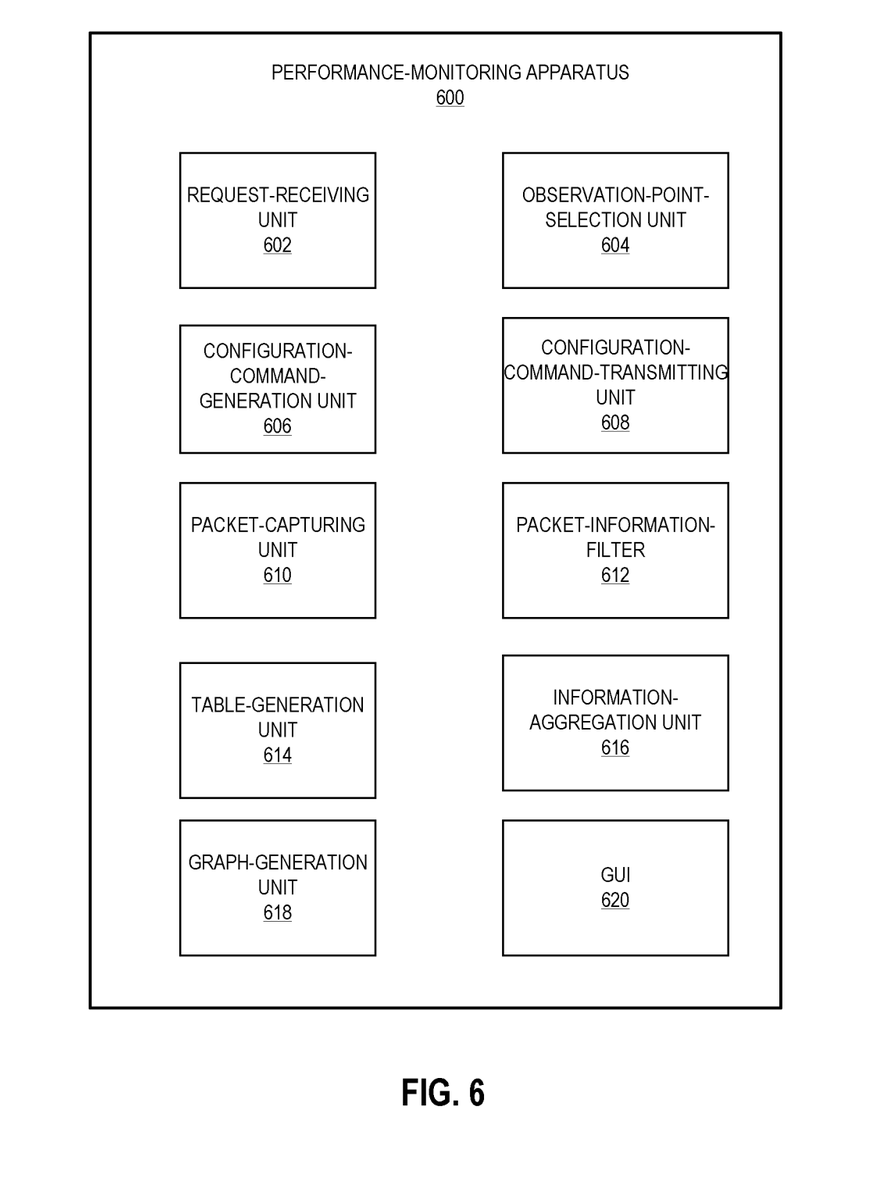
FIG. 6 presents an exemplary apparatus for segment-level flow-specific performance monitoring, according to one embodiment.

FIG. 6 presents an exemplary apparatus for segment-level flow-specific performance monitoring, according to one embodiment. In this example, performance-monitoring apparatus 600 can reside on one of the network devices on the path of a to-be-monitored flow. Performance-monitoring apparatus 600 can include a request-receiving unit 602, an observation-point-selection unit 604, a configuration-command-generation unit 606, a configuration-command-transmitting unit 608, a packet-capturing unit 610, a packet-information-filter unit 612, a table-generation unit 614, an information-aggregation unit 616, a graph-generation unit 618, and a GUI 620.

Request-receiving unit 602 can be responsible for receiving a request for performing the monitoring, either from a network operator or an end user. The request can specify a flow to be monitored (e.g., a four-tuple including the source/destination IP addresses and the source/destination port numbers). Additional parameters, such as the time and duration of the packet-capturing window and the network segments of interest, can also be included in the request.

Observation-point-selection unit 604 can be responsible for selecting a set of network devices to function as observation points along the path of the specified flow. Configuration-command-generation unit 606 can be responsible for generating the configuration command based on the request, and configuration-command-transmitting unit 608 can be responsible for transmitting the configuration command to the selected network devices to configure them to function as observation points.

Packet-capturing unit 610 can be responsible for capturing packets arriving at the network device during the predetermined packet-capturing window. In some embodiments, packet-capturing unit 610 can implement a packet-analyzing tool (e.g., Wireshark, tcpdump, etc.). Packet-information-filter unit 612 can be responsible for applying a filter to obtain flow-specific packet information.

Table-generation unit 614 can be responsible for generating a delay table for packets with different sequence numbers. More specifically, the delay for a packet of a particular sequence number can be determined based on the difference in the timestamps of a request packet and its corresponding response packet of the particular sequence number. Information-aggregation unit 616 can be responsible for aggregating the flow-specific packet statistics (e.g., the delay tables) from different observation points along the path in order to obtain segment-level performance data. Graph-generation unit 618 can be responsible for generating a graphical representation of the segment-level performance data, and GUI 620 can display the graphical representation to a user.

Figure 7:
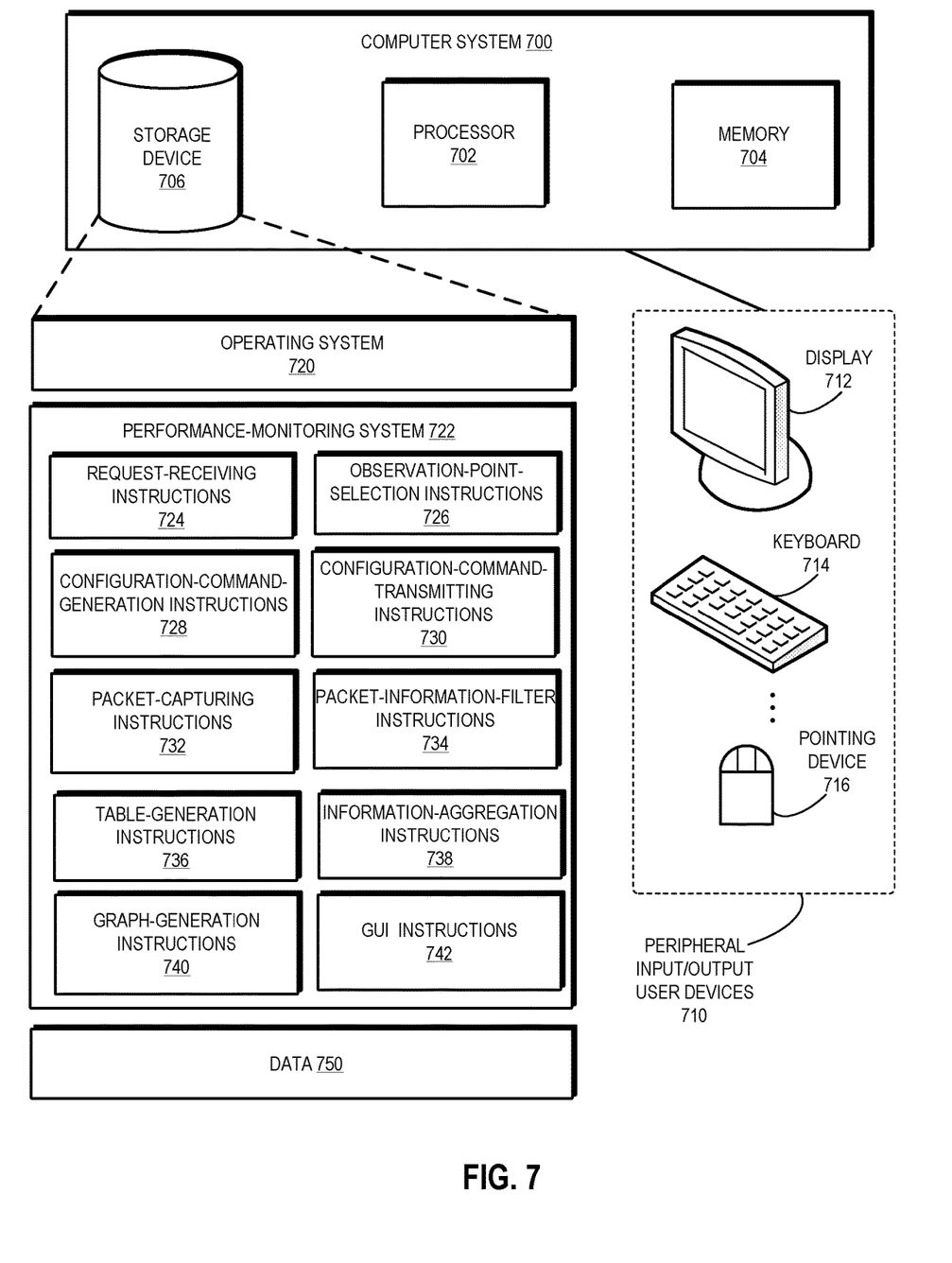
FIG. 7 illustrates an exemplary computer system that facilitates segment-level flow-specific performance monitoring, according to one embodiment.

FIG. 7 illustrates an exemplary computer system that facilitates segment-level flow-specific performance monitoring, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, a performance-monitoring system 722, and data 750.

Performance-monitoring system 722 can include instructions, which when executed by computer system 700, can cause computer system 700 or processor 702 to perform methods and/or processes described in this disclosure. Specifically, performance-monitoring system 722 can include instructions for receiving a performance-monitoring request (request-receiving instructions 724), instructions for selecting observation points (observation-point-selection instructions 726), instructions for generating the configuration command (configuration-command-generation instructions 728), instructions for transmitting the configuration command (configuration-command-transmitting instructions 730), instructions for capturing packets (packet-capturing instructions 732), instructions for filtering packet information (packet-information-filter instructions 734), instructions for generating a delay table (table-generation instructions 736), instructions for aggregating information from multiple observation points (information-aggregation instructions 738), instructions for generating graphical representations (graph-generation instructions 740), and instructions for implementing a GUI (GUI instructions 742).

In general, the disclosed embodiments provide a mechanism to allow end users or network operators to monitor the performance of different segments along the end-to-end path of a service instance or flow. More specifically, by configuring multiple network devices along the path to collect flow-specific packet statistics and by aggregating the packet statistics from the multiple network devices, performance data (e.g., delay, jitter, packet loss, etc.) for each network segment can be inferred. The mechanism also provides flexibility in the segmentation of the end-to-end path (e.g., the path can be arbitrarily segmented by configuring a selected set of network devices as observation points). In the examples throughout this disclosure, the monitored flow is a TCP flow. In practice, the same principle can be used to monitor other types of traffic, as long as the end-to-end communication includes request and corresponding response packets.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for monitoring performance of a network, the method comprising:
    determining a portion of the network is experiencing adverse network conditions resulting in a determination;
    receiving a performance-monitoring request based on the determination;
    in response to the receiving the performance-monitoring request, selecting a plurality of network devices along an end-to-end path from an application server to a terminal device;
    configuring each selected network device to function as an observation point to obtain flow-specific packet information, wherein the configuring comprises activating a performance-monitoring unit residing on each selected network device to capture packets arriving at a network interface of each selected network device, and applying a filter on the captured packets based on a four-tuple comprising a source address, a destination address, a source port number, and a destination port number;
    receiving, from each observation point, the flow-specific packet information; and
    aggregating flow-specific packet information received from multiple observation points to obtain performance data associated with one or more segments along the end-to-end path, each segment being defined by a pair of observation points.

2. The computer-executable method of claim 1, wherein the adverse network conditions correspond to a network delay, packet loss rate, or a combination thereof.

3. The computer-executable method of claim 2, wherein the performance-monitoring unit collects packet statistics.

4. The computer-executable method of claim 3, wherein the performance data is based on the packet statistics.

5. The computer-executable method of claim 2, wherein configuring each selected network device further comprises activating the performance-monitoring unit for a predetermined time interval.

6. The computer-executable method of claim 1, wherein the flow-specific packet information comprises a roundtrip delay of a packet.

7. The computer-executable method of claim 6, wherein the roundtrip delay is obtained by comparing timestamps of the packet and a corresponding response packet.

8. The computer-executable method of claim 6, wherein the flow-specific packet information further comprises jitter and packet loss information.

9. The computer-executable method of claim 6, wherein aggregating the flow-specific packet information comprises subtracting roundtrip delays of the packet observed at two observation points to determine a delay caused by a segment between the two observation points.

10. The computer-executable method of claim 1, further comprising generating and displaying a graphical representation of the performance data associated with the one or more segments.

11. A computer system for monitoring performance of a network, the computer system comprising:
    a processor; and a storage device coupled to the processor and storing instructions, which when executed by the processor cause the processor to perform a method, the method comprising:
- determining a portion of the network is experiencing adverse network conditions resulting in a determination;
- receiving a performance-monitoring request based on the determination;
- in response to the receiving the performance-monitoring request, selecting a plurality of network devices along an end-to-end path from an application server to a terminal device;
- configuring each selected network device to function as an observation point to obtain flow-specific packet information, wherein the configuring comprises activating a performance-monitoring unit residing on each selected network device to capture, over a predetermined time interval, packets arriving at a network interface of each selected network device resulting in captured packets and applying a filter on the captured packets based on a four-tuple comprising a source address, a destination address, a source port number, and a destination port number;
- receiving, from each observation point, the flow-specific packet information; and
- aggregating flow-specific packet information received from multiple observation points to obtain performance data associated with one or more segments along the end-to-end path, each segment being defined by a pair of observation points.

12. The computer system of claim 11, wherein the adverse network conditions correspond to a network delay, packet loss rate, or a combination thereof.

13. The computer system of claim 12, wherein the performance-monitoring unit collects packet statistics, wherein the performance data is based on the packet statistics.

14. The computer system of claim 11, wherein the flow-specific packet information comprises a roundtrip delay of a packet, and wherein the roundtrip delay is obtained by comparing timestamps of the packet and a corresponding response packet.

15. The computer system of claim 14, wherein the flow-specific packet information further comprises jitter and packet loss information.

16. The computer system of claim 14, wherein aggregating the flow-specific packet information comprises subtracting roundtrip delays of the packet observed at two observation points to determine a delay caused by a segment between the two observation points.

17. The computer system of claim 11, wherein the method further comprises generating and displaying a graphical representation of the performance data associated with the one or more segments.

18. A non-transitory computer-readable storage device storing instructions that when executed by a computer cause the computer to perform a method for monitoring performance of a network, the method comprising:
- determining a portion of the network is experiencing adverse network conditions resulting in a determination;
- receiving a performance-monitoring request based on the determination;
- in response to the receiving the performance-monitoring request, selecting a plurality of network devices along an end-to-end path from an application server to a terminal device;
- configuring each selected network device to function as an observation point to obtain flow-specific packet information, wherein the configuring comprises activating a performance-monitoring unit residing on each selected network device to capture, over a predetermined time interval, packets arriving at a network interface of each selected network device resulting in captured packets, and applying a filter on the captured packets based on a four-tuple comprising a source address, a destination address, a source port number, and a destination port number;
- receiving, from each observation point, the flow-specific packet information; and
- aggregating flow-specific packet information received from multiple observation points to obtain performance data associated with one or more segments along the end-to-end path, each segment being defined by a pair of observation points.

19. The non-transitory computer-readable storage device of claim 18, wherein the adverse network conditions correspond to a network delay, packet loss rate, or a combination thereof.

20. The non-transitory computer-readable storage device of claim 18, wherein the flow-specific packet information comprises a roundtrip delay of a packet, and wherein aggregating the flow-specific packet information comprises subtracting roundtrip delays of the packet observed at two observation points to determine a delay caused by a segment between the two observation points.

* * * * *